(12) United States Patent
Vasudev et al.

(10) Patent No.: US 12,375,947 B2
(45) Date of Patent: Jul. 29, 2025

(54) EVALUATING TELECOMMUNICATION SERVICES BASED ON DEPENDENCIES SYSTEMS AND METHODS

(71) Applicant: T-Mobile USA, Inc., Bellevue, WA (US)

(72) Inventors: Sujit Vasudev, Bellevue, WA (US); Venkata Reddy Donthireddy, Sammamish, WA (US); Scott Randall Baxter, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/828,736

(22) Filed: May 31, 2022

(65) Prior Publication Data

US 2023/0403572 A1  Dec. 14, 2023

(51) Int. Cl.

| | |
|---|---|
| *H04W 24/08* | (2009.01) |
| *H04L 41/0895* | (2022.01) |
| *H04L 67/10* | (2022.01) |
| *H04W 4/50* | (2018.01) |
| *H04W 24/02* | (2009.01) |
| *H04W 28/02* | (2009.01) |
| *H04W 28/24* | (2009.01) |

(Continued)

(52) U.S. Cl.
CPC ............. *H04W 24/02* (2013.01); *H04W 4/50* (2018.02); *H04W 24/08* (2013.01); *H04W 28/0268* (2013.01); *H04W 28/24* (2013.01); *H04L 41/045* (2022.05); *H04L 41/0806* (2013.01); *H04L 41/0895* (2022.05); *H04L 67/10* (2013.01)

(58) Field of Classification Search
CPC ......... H04L 41/04; H04L 41/12; H04L 41/14; H04L 41/40; H04L 41/50; H04L 41/045; H04L 41/0806; H04L 41/0895
See application file for complete search history.

(56) References Cited

U.S. PATENT DOCUMENTS

| | | |
|---|---|---|
| 6,418,205 B2 | 7/2002 | Capers et al. |
| 6,453,161 B1 | 9/2002 | Touati et al. |

(Continued)

FOREIGN PATENT DOCUMENTS

| | | |
|---|---|---|
| CN | 101478766 A | 7/2009 |
| DE | 102006001226 B4 | 2/2008 |

(Continued)

*Primary Examiner* — Tom Y Chang
(74) *Attorney, Agent, or Firm* — Perkins Coie LLP

(57) ABSTRACT

A system and methods for managing dependencies for telecommunication services, such as software applications, are disclosed. To evaluate a telecommunication service comprising a software application, a set of declared dependencies are accessed for the service. The declared dependencies include services upon which the telecommunication service depends. Actual dependencies are identified for the telecommunication service, such as by analyzing operations performed by the telecommunication service based on network traffic between the telecommunication service and one or more other services. The telecommunication service is evaluated by comparing the actual dependencies to the declared dependencies. For example, the system can evaluate whether actual dependencies are consistent with dependencies specified in an architecture or design for the telecommunication service.

20 Claims, 5 Drawing Sheets

(51) Int. Cl.
*H04L 41/045* (2022.01)
*H04L 41/0806* (2022.01)

(56) References Cited

U.S. PATENT DOCUMENTS

| | | |
|---|---|---|
| 6,512,988 B1 | 1/2003 | Kanago |
| 7,032,021 B1 | 4/2006 | Froeschl et al. |
| 7,093,013 B1 | 8/2006 | Hornok et al. |
| 7,623,452 B2 | 11/2009 | Roeder |
| 7,729,286 B2 | 6/2010 | Mishra |
| 8,079,015 B2 | 12/2011 | Lind et al. |
| 8,082,335 B2 | 12/2011 | Mishra et al. |
| 8,190,409 B2 | 5/2012 | Barbaresi et al. |
| 8,204,981 B1 | 6/2012 | Mishra |
| 8,380,833 B2 | 2/2013 | De et al. |
| 8,484,328 B2 | 7/2013 | Chou et al. |
| 8,982,893 B2 | 3/2015 | Akhtar et al. |
| 9,031,551 B2 | 5/2015 | Karla et al. |
| 9,654,299 B2 | 5/2017 | Shinde et al. |
| 9,697,489 B2 | 7/2017 | Nayak et al. |
| 9,961,539 B2 | 5/2018 | Jäger et al. |
| 10,242,328 B2 | 3/2019 | Lopez |
| 10,432,471 B2 | 10/2019 | Gershaft et al. |
| 2003/0101447 A1 | 5/2003 | Nathan et al. |
| 2003/0120764 A1 | 6/2003 | Laye et al. |
| 2004/0139176 A1 | 7/2004 | Farrell et al. |
| 2005/0086141 A1 | 4/2005 | Lewis |
| 2005/0255867 A1 | 11/2005 | Nicodem |
| 2006/0058010 A1 | 3/2006 | Williams et al. |
| 2010/0142692 A1 | 6/2010 | Gotta et al. |
| 2014/0105039 A1* | 4/2014 | McDysan .............. H04L 45/02 370/252 |
| 2016/0036725 A1* | 2/2016 | Syed .................. H04L 41/5041 709/226 |
| 2017/0161051 A1* | 6/2017 | Nikam ................ G06F 16/9024 |
| 2022/0245475 A1* | 8/2022 | Blizzard .................. G06N 5/025 |
| 2022/0357936 A1* | 11/2022 | Duggal ..................... G06F 8/60 |
| 2023/0021600 A1* | 1/2023 | Singer .................. H04L 41/5032 |

FOREIGN PATENT DOCUMENTS

| | | |
|---|---|---|
| EP | 1717738 A1 | 11/2006 |
| EP | 2114032 A1 | 11/2009 |
| JP | 2000099430 A | 4/2000 |
| WO | 2007042779 A1 | 4/2007 |
| WO | 2007057685 A2 | 5/2007 |
| WO | 2007096591 A2 | 8/2007 |
| WO | 2021023678 A1 | 2/2021 |
| WO | 2021023679 A1 | 2/2021 |

* cited by examiner

EVALUATING TELECOMMUNICATION SERVICES BASED ON DEPENDENCIES SYSTEMS AND METHODS

BACKGROUND

Businesses, such as telecommunication service providers, rely on many services, such as software applications, to deliver various business functionalities. These services can be distributed across an enterprise and/or on the cloud, and they can relate to one another and/or to one or more underlying services according to various dependencies. Additionally, instances of services can be deployed in various environments within an enterprise, such as development environments, testing environments, model environments, production environments, quality assurance environments, experimental environments, disaster recovery environments, and so forth.

BRIEF DESCRIPTION OF THE DRAWINGS

Detailed descriptions of implementations of the present invention will be described and explained through the use of the accompanying drawings.

Figure 1:
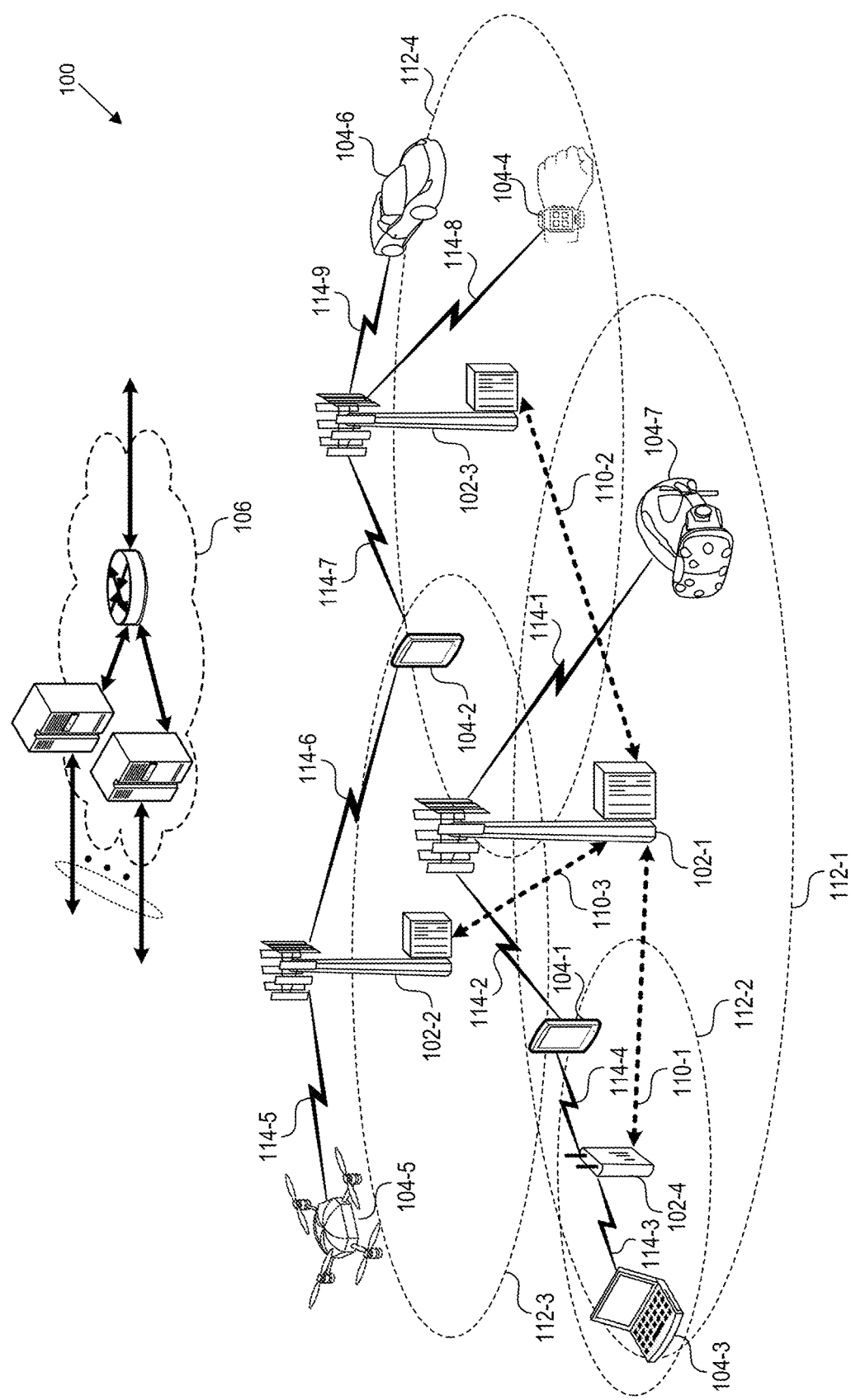
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Telecommunication service providers face difficult technical challenges related to managing dependencies for telecommunication services. As used herein, a "telecommunication service" can be, for example, a software application, a software service (e.g., a web service) or microservice, a database, and so forth. Additionally, as used herein, a "dependency" can be a relationship between a telecommunication service (e.g., a software application) and one or more other services whereby the telecommunication service accesses and uses features of the one or more other services to provide functionalities of the telecommunication service.

Existing systems typically use manual processes for management of telecommunication service dependencies and modification of dependencies, which can cause errors and/or result in incomplete information related to dependencies. For example, developers may define dependencies in configurations that are maintained and managed manually. Thus, when a service or component is redeployed in a new location (e.g., in a different environment), this new location (e.g., endpoint) must then be manually configured in all services that depend upon the service or component. Additionally, existing systems lack a central registry for tracking and/or managing dependencies, such as a central registry that can facilitate discovery of services based on dependencies, provide notifications to users associated with telecommunication services, and so forth. Furthermore, existing systems typically track and manage dependencies in a way that is specific to the environments in which applications or services are deployed, which can make it difficult to maintain and manage dependencies when a telecommunication service must be deployed in a new or different environment. Additionally, existing systems can suffer from drift, wherein services diverge from documented and/or declared dependencies (e.g., due to updates, patches, fixes, and so forth), which can cause problems related to maintenance of services. The foregoing problems are compounded as organizations deploy more complex configurations of services, such as combining modern and legacy platforms or systems, splitting services into multiple microservices, and so forth. These and other problems can lead to failures or outages of telecommunication services, which can negatively impact telecommunication service providers, employees, subscribers, third-party services, and so forth.

Accordingly, there is a need for technologies that overcome the foregoing problems and provide other benefits. For example, there is a need for a system that registers and tracks telecommunication service dependencies using a central platform. Additionally, there is a need for a system that manages telecommunication service dependencies without regard to a particular environment in which an instance of a telecommunication service is deployed. Furthermore, there is a need for a system that triggers actions based on registered telecommunication service dependencies, such as triggering notifications to users in response to changes in telecommunication service dependencies, triggering a pipeline failure based on detecting an outage or absence of a telecommunication service, causing deployment of an ephemeral environment based on registered telecommunication service dependencies, and so forth. And there is a need for a system that facilitates evaluation of telecommunication services based on dependencies, such as by comparing declared dependencies to actual dependencies (e.g., dependencies empirically observed at runtime).

Disclosed herein are systems and related methods for registering and managing dependencies of telecommunication services ("system" or "dependency management system"), such as software applications or services. The disclosed system tracks and manages dependencies and evaluates telecommunication services based on dependencies. To evaluate a telecommunication service, the system receives or accesses declared dependencies for the telecommunication service. The telecommunication service can be, for example, a software application, and the dependencies can each be associated with services upon which the telecommunication service depends (hereinafter, "dependent services"), such as a different software application, a service or microservice, a database, and so forth. Using source code for the telecommunication service, the system causes execution of at least some operations specified in the source code. Alternatively, a different system (e.g., a continuous integration/continuous deployment (CICD) platform) can cause execution of operations. In these and other implementations, results of the execution of the operations are analyzed to identify actual dependencies for the telecommunication service, which can be based at least in part on network traffic associated with the operations. The actual dependencies are then compared to the declared dependencies to evaluate at least one feature of the telecommunication service. For example, the evaluation can assess whether the telecommunication service operates consistent with a design architecture for the telecommunication service, which includes the declared dependencies. Based on the results of the evaluations, one or more actions can be taken, such as generating a notification or message. The notification or message can indicate, for example, that the telecommunication service is functioning consistent with the design architecture (e.g., when the actual dependencies match/closely match the declared dependencies). Additionally or alternatively, the notification or message can indicate that the telecommunication service is not functioning consistent with the design architecture (e.g., when there is a mismatch between at least one actual dependency and a corresponding declared dependency), in which case additional actions can be recommended to resolve the inconsistency.

In some implementations, the dependency management system can use declared dependencies for a telecommunication service to perform or trigger other actions. For example, the disclosed system can be used to evaluate and/or test telecommunication services, such as by triggering a pipeline failure for a software application when the system determines that one or more services upon which the application depends are absent or have failed, rather than waiting for the software application to fail. In some implementations, the disclosed system can be used to cause failover to an alternative service when a dependent service is found to be unavailable or down. Additionally or alternatively, the disclosed system can use declared dependencies to generate environments in which a telecommunication service can be deployed, such as ephemeral environments for the telecommunication service and any services upon which the telecommunication service depends, which can be used to evaluate or test the telecommunication service, perform quality assurance, and so forth. Furthermore, the dependency management system can generate and send various notifications to facilitate management of telecommunication services and dependencies, such as notifications related to changes to services upon which a telecommunication service depends. And the dependency management system can provide various reports, diagrams, analyses, interfaces, graphs, and so forth related to telecommunication services. To facilitate management of telecommunication services and dependencies, the disclosed system can be integrated into various other tools and/or processes for managing telecommunication services, such as continuous integration/continuous deployment (CICD) tools and/or processes, configuration management databases (CMDBs), and/or information technology service management (ITSM tools).

In some implementations, the dependency management system can reduce downtime and/or testing scope for services, as well as limit required maintenance for services, using dependency trees. For example, the disclosed system can facilitate testing and/or maintenance of services based on declared dependencies. In some implementations, the dependency management system can be used to automate connections (e.g., network connections) between services based on dependencies, such as by causing and/or facilitating changes to routing and/or firewalls to facilitate connectivity between services. In some implementations, the dependency management system can be used to automate and/or facilitate exchange of credentials or secrets between dependent services without manual intervention. In some implementations, the dependency management system can be used for versioned and/or incremental introduction of new services to replace an existing dependency.

Advantages of the disclosed technology include improved ability to manage telecommunication services and dependencies, such as by identifying and/or isolating errors related to dependencies. Additionally, the disclosed technology can track and manage dependencies without regard to specific environments in which telecommunication services and/or services upon which telecommunication services depend are deployed. Furthermore, the disclosed technology evaluates telecommunication services by comparing actual performance of telecommunication services to architectures and/or intended performance of the telecommunication services, such as by comparing declared dependencies to actual dependencies, which can be determined using dependency analysis at runtime.

For illustrative purposes, examples are described herein in the context of telecommunication services. However, a person skilled in the art will appreciate that the disclosed system can be applied in other contexts. For example, the disclosed system (e.g., used in combination with a configuration management database (CMDB)) can be used to manage and/or analyze dependencies from services to deployment platforms (e.g., Kubernetes clusters, pivotal cloud foundry (PCF) Foundations) and/or to infrastructure components (e.g., servers, routers, firewalls). Additionally or alternatively, the disclosed system can be used to manage dependencies to data components, such as batch jobs, queues, extract-transform-loads (ETL), and so forth. Furthermore, the disclosed system can be used to manage versioned dependencies, such that services can depend on different versions of the same services in different locations. Additionally or alternatively, the system (e.g., used in combination with a business process management system) can be used to differentiate between different kinds of dependencies (e.g., critical vs. non-critical dependencies), such that notifications, alerts, and/or actions (e.g., escalation) can be differentiated based on associated impacts for the different kinds of dependencies. Generally, speaking, the dependency management system can be used in any context where dependencies are managed for a software application or service.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Dependency Management System

Figure 2:
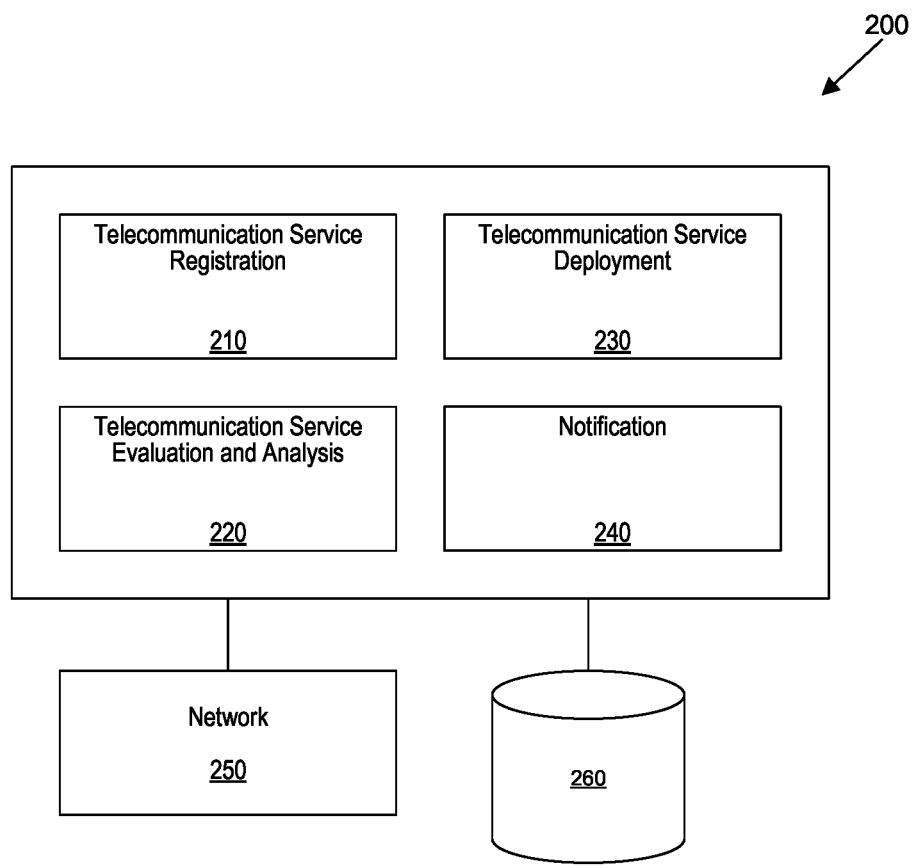
FIG. 2 is a block diagram that illustrates components of a dependency management system in some implementations.

FIG. 2 is a block diagram that illustrates components of a system 200 for managing telecommunication service dependencies in some implementations. All or portions of the system 200 can be provided, for example, by a telecommunications service provider that provides all or portions of the network 100 using one or more components of the network 100. The system 200 can include functional modules that are implemented with a combination of software (e.g., executable instructions or computer code) and hardware (e.g., one or more memories and one or more processors). Accordingly, as used herein, in some examples a module is a processor-implemented module or set of code and represents a computing device having one or more processors that are at least temporarily configured and/or programmed by executable instructions carried in one or more memories to perform one or more of the functions described herein.

The dependency management system 200 includes a telecommunication service registration module 210, a telecommunication service evaluation and analysis module 220, a telecommunication service deployment module 230, and a notification module 240, which are each discussed separately below. Additionally, the dependency management system includes a network component 250 via which the system 200 and/or its modules can communicate with external entities, devices, or systems, such as to access telecommunication services, to access data associated with telecommunication services (e.g., dependency information), to send notifications related to telecommunication services and/or dependencies, to deploy and/or monitor telecommunication services, and so forth. And the dependency management system includes a storage component 260, which can be used to store and/or access data, such as data associated with telecommunication services and/or dependencies. The storage component 260 comprises local storage, storage on a server system or on the cloud, or a combination thereof. The storage component 260 stores data for or used by the system 200, such as data related to telecommunication services and/or dependencies.

Telecommunication Service Registration Module

To facilitate management of telecommunication services, the system 200 includes a telecommunication service registration module 210, via which telecommunication services and their dependencies are registered. The telecommunication service registration module 210 can comprise, for example, a central platform or registry for a telecommunication service provider or other entity, which stores, tracks, and/or manages services and/or their dependencies. As described herein, the services managed using the system 200 can be software applications or software services, and they can depend on one or more other applications or services, such as microservices, databases, web services, and so forth. Using the telecommunication service registration module 210, the system 200 can maintain a registry of every telecommunication service used by a telecommunication service provider as well as the services upon which each telecommunication service depends.

In some implementations, dependencies for telecommunication services are stored and/or received using YAML (YAML Ain't Markup Language) syntax. Each dependency includes an identifier for a telecommunication service and an identifier for a dependent service. For example, a service upon which a telecommunication service depends can be identified in a standardized YAML template using an identifier for the dependent service, such as a CMDB asset identifier. Additional information included in a dependency declaration (e.g., a YAML file) can include a version of the dependency declaration format, version information for the telecommunication service, location or partition information for the telecommunication service, one or more service types (e.g., database, service, queue, etc.), a location where health information for the service can be accessed, and/or location information associated with dependency information. The standardized YAML template is configured into the CICD pipeline for the telecommunication service. Dependencies associated with telecommunication services can be stored in separate YAML files, which can be maintained and/or associated with source code for the telecommunication services.

Additionally or alternatively, the telecommunication service registration module 210 can provide a search function via a user interface to search for dependent services (e.g., using keywords) to locate dependent services, such as when a user does not know the identifier (e.g., CMDB asset identifier) for the dependent service. Additionally or alternatively, one or more dependencies for a telecommunication service can be defined as "unknown," and the telecommunication service registration module 210 can periodically scan or search for a corresponding service, such as based on one or more keywords associated with the telecommunication service. When a match or potential match is found, then the system 200 can send a notification (e.g., using the notification module 240) to a user (e.g., a developer) that registered the telecommunication service.

Once a telecommunication service and its dependencies are registered via the telecommunication service registration module 210, various information about the telecommunication service can be accessed. For example, the telecommunication service registration module 210 can provide a user interface that displays all registered dependencies and endpoints for a telecommunication service. In some implementations, the telecommunication registration module 210 can provide and/or generate graphical representations of dependencies, such as dependency trees, via which information about the telecommunication services can be accessed. In these and other implementations, health information associated with each telecommunication service can be accessed using the graphical representations (e.g., by clicking on a graphical representation of a telecommunication service). The user interface can provide various views of the information, such as segmenting dependencies and/or endpoints by environment scope and/or by identifiers for dependent services (e.g., CMDB asset identifiers). The user interface can also allow for filtering and/or searching services based on various parameters, such as identifiers, environments, and/or endpoints. Services registered via the telecommunication service registration module 210 can also be associated with groups (e.g., asset groups), group identifiers, version information, and so forth. The telecommunication service registration module 210 can also facilitate access to the telecommunication service information by other systems. For example, the telecommunication service registration module 210 can provide one or more APIs and/or command line interfaces (CLIs) via which external systems (e.g., automations) can access dependency information associated with telecommunication services.

The telecommunication service registration module 210 can also provide and/or generate one or more graphical user interfaces (GUIs) for visualizing dependency information associated with telecommunication services (e.g., using diagrams). For example, a GUI can include a dependency tree that shows all dependencies of a telecommunication resources as well as upstream and downstream dependencies (i.e., dependencies of services that depend on the telecommunication services, and dependencies of services upon which the telecommunication service depends). In some implementations, the dependency tree displays additional information about each depicted service, such as health, availability, changes, incident history (e.g., outages), and so forth. This additional information can be accessed and/or retrieved using one or more plugins. In some implementations, the dependency tree and/or other GUI features are interactive, such that a user can click on one or more depicted services and access additional information about a service, such as dependencies, status information, location information (e.g., endpoints), and so forth.

In some implementations, GUIs provided by the telecommunication service registration module 210 can provide visual representations of information associated with telecommunication services and/or dependencies, such as color-coded representations. For example, telecommunication services displayed in a GUI can be color-coded to highlight services that participate in specific process flows. Additionally or alternatively, a GUI can include indications (e.g., icons and/or color-coded indications) to visually represent traffic through dependencies, which can indicate varying volumes of traffic and/or transactions (e.g., a "heat map" with visual indications of volumes of traffic via dependency relationships). In these and other implementations, the telecommunication service registration module 210 generates GUIs to emphasize information that is likely to be important to a user, such as allowing for quick capture of diagnostic information during incident triages and/or providing visual representations of relative importance of criticality of dependencies and/or process flows. In some implementations, one or more GUIs can be generated based, at least in part, on a physical characteristic of a hardware display on which the one or more GUIs is being displayed, such as by formatting a GUI for display on a device having a small screen (e.g., a smartphone or other mobile device). In these and other implementations, the disclosed system determines a physical characteristic of the hardware display (e.g., a physical dimension or pixel count), and generates the GUI based at least in part on the physical characteristic, such that the information that is likely to be important to the user (e.g., associated with a missing or erroneous dependency) is emphasized in the GUI.

Telecommunication Service Evaluation and Analysis Module

The telecommunication service evaluation and analysis module 210 performs and/or facilitates various processes for evaluating and/or analyzing telecommunication services and dependencies.

In some implementations, the telecommunication service evaluation and analysis module 220 accesses dependency information for a telecommunication service (e.g., a service registered via the telecommunication service registration module 210) and generates one or more performance metrics and/or health metrics for the telecommunication service. The performance metrics and/or health metrics can be based, at least in part, on the dependency information for the telecommunication service. Using performance and/or health metrics, the telecommunication service evaluation and analysis module 220 can quickly identify one or more telecommunication services at fault during an outage or incident and provide recommendations for resolving the outage or incident. For example, the telecommunication service evaluation and analysis module 220 can recommend, facilitate, and/or cause failover to one or more alternative telecommunication services in response to determining that a service is experiencing an outage or incident.

In some implementations, the telecommunication service evaluation and analysis module 220 provides a health endpoint for each registered telecommunication service via which health information associated with the telecommunication service. The health information can include a health score for the telecommunication service, such as a numerical score or letter grade, which can also include a narrative describing reasons for the health score. In these and other implementations, the telecommunication service evaluation and analysis module 220 can generate and/or provide an aggregate health score for a service by retrieving health scores for each dependent service for the telecommunication service.

In some implementations, the telecommunication service evaluation and analysis module 220 can use and/or provide dependency information to determine criticality of impact of an outage for a single telecommunication service and/or a combination of telecommunication services, including for both total and partial outages. For example, the dependency information can be used to determine an impact on business operations when one or more telecommunication services experience a total or partial outage.

In some implementations, analyzing and/or evaluating a telecommunication service can include determining one or more characteristics of the telecommunication service based, at least in part, on dependency information. The one or more characteristics can include criticality (e.g., relative importance of the service in one or more critical process flows), redundancy (e.g., ease with which the service can be replaced), scalability (e.g., ease with which the service can be added and/or resources for the service scaled), and so forth. These one or more characteristics can be determined for individual services and/or across multiple services, such as based on a service and all of its dependent services. These one or more characteristics can be displayed in one or more GUIs to facilitate analysis and/or evaluation of telecommunication services.

In some implementations, the telecommunication service evaluation and analysis module 220 can perform and/or trigger one or more actions based on analysis or evaluation of a telecommunication service. For example, the module 220 can determine that a telecommunication service will fail based on an absence or failure of a service upon which the telecommunication service depends, and the module 220 can trigger a pipeline failure based on the determination, rather than waiting for the telecommunication service to fail (e.g., at runtime). Additionally or alternatively, the telecommunication service evaluation and analysis module 220 can trigger one or more notifications, as described below with reference to the notification module 240. In these and other implementations, the telecommunication service evaluation and analysis module 220 can trigger events using one or more APIs (e.g., to invoke an external system, such as a CICD platform), webhooks (e.g., to send information to an external system), and/or events (e.g., to send information to consumers, which can be asynchronous). Additionally or alternatively, one or more external systems can access data from the disclosed system, which can be used to trigger actions, such as by providing one or more APIs via which the disclosed system can provide data. For example, the one or more APIs can provide a list of services associated with a process flow, one or more upstream or downstream dependencies associated with a service, aggregated health and/or availability information for a service, and/or location-specific information associated with a service (e.g., to track physical infrastructure for or associated with a service).

Telecommunication Service Deployment Module

The telecommunication service deployment module 230 generates and/or facilitates one or more deployments of telecommunication services and/or services upon which a telecommunication service depends. For example, the telecommunication service deployment module 230 can generate and/or facilitate generation of an environment in which a telecommunication service and its dependent services are deployed, such as an ephemeral environment.

In some implementations, generation of an environment is orchestrated within a CICD pipeline. For example, the telecommunication service deployment module 230 can identify all services that must be deployed in the environment. A user may specify an application that the user wishes to deploy in an ephemeral environment, and the telecommunication service deployment module 230 accesses declared dependency for the application to determine all services to be deployed in the environment. Using infrastructure code provided by the identified services, the CICD pipeline provisions infrastructure required for the identified services. The telecommunication service deployment module 230 further accesses and/or provides version information of source code for each service runtime, which is used by the CICD pipeline to deploy/provision the service runtime. In some implementations, generating the environment can include configuration of dependencies using registry and/or catalog information. Additionally or alternative, if additional network connectivity is involved, a firewall management system and/or a software-defined network (SDN) system can be triggered or deployed.

Notification Module

The notification module 240 generates and sends various notifications related to telecommunication services and/or dependencies. The notifications can be sent via various communication channels, such as via email, Slack, text messaging (e.g., short message service (SMS)), pagers, video and/or voice calls, or other communication or collaboration tools.

In some implementations, the system 200 (e.g., using the telecommunication service registration module 210) tracks upstream and/or downstream dependencies of a telecommunication service to determine whether a change to a telecommunication service will cause failure of an upstream and/or downstream service. In response to determining that a change will cause a failure, the notification module 240 can generate and send a notification to a user associated with the telecommunication service that is being modified and/or users associated with the upstream and/or downstream services affected by the modification. In some implementations, the system 200 can also prevent a modification of a telecommunication service that will cause a failure.

In some implementations, the system 200 (e.g., using the telecommunication service registration module 210) tracks changes to a telecommunication service (e.g., a new deployment or location, a new version, changes to dependencies, health and/or performance changes, etc.) and generates/sends notifications to users associated with upstream and/or downstream services of the telecommunication service to provide information about the changes.

In some implementations, the notification module 240 can also generate and send notifications in response to identifying broken dependencies, complex or cyclic dependencies, unregistered or missing dependencies, discrepancies between declared and actual dependencies, and so forth.

Evaluating Telecommunication Services

Figure 3:
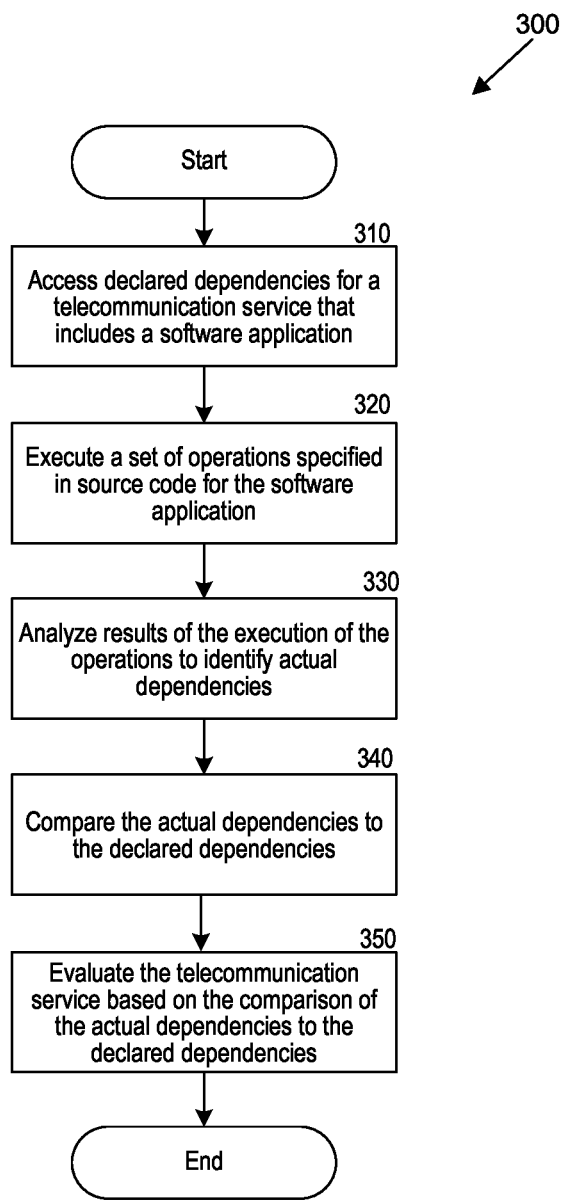
FIG. 3 is a flow diagram that illustrates a process to evaluate a telecommunication service in some implementations.

FIG. 3 is a flow diagram that illustrates a process 300 to evaluate a telecommunication service based on comparing actual dependencies and declared dependencies in some implementations. This comparison can, for example, indicate whether a telecommunication service is operating consistent with an architecture or design for the telecommunication service, which includes dependencies for the telecommunication service. At least a portion of the process 300 can be performed by a dependency management system, such as the system 200 of FIG. 2.

The process 300 begins at block 310, where a set of declared dependencies are accessed and/or received for a telecommunication service comprising a software application. Each dependency comprises a service upon which the telecommunication service depends, and can include various information about the service, such as a location, name, identifier, and/or environment, etc. for the service. The dependencies are retrieved from one or more data structures (e.g., tables and/or databases) storing a catalog of dependencies.

The process 300 proceeds to block 320, where source code is accessed for the software application, and operations are performed/executed based on the source code. In some implementations, the operations are triggered by or using an external system, such as a CICD platform. The operations can include sending and/or receiving communications from one or more services upon which the telecommunication service depends, such as communications transmitted over a network.

The process 300 proceeds to block 330, where results of the operations are analyzed to identify actual dependencies for the software application. For example, network traffic can be monitored in relation to the performance or execution of the operations, such that traffic between the software application and a different service can be used to empirically identify a dependency associated with the different service. Network traffic information can be collected by a network management system, from which the disclosed system retrieves the network traffic information. The retrieved network traffic is then used to identify the actual dependencies.

The process 300 proceeds to block 340, where the actual dependencies identified at block 330 are compared to the declared dependencies that are accessed/received at block 310.

The process 300 proceeds to block 350, where the telecommunication service is evaluated based, at least in part, on the comparison of the actual dependencies to the declared dependencies at block 340. For example, when the actual dependencies are found to match the declared dependencies (e.g., all or substantially all dependencies match), then this can be an indication that the telecommunication service is functioning properly and/or consistent with an architecture for the telecommunication service, which specifies intended dependencies for the telecommunication service. When the actual dependencies do not match the declared dependencies, this can indicate, for example, that the service has experienced drift, wherein the service has changed such that it is no longer consistent with a design or architecture for the service (e.g., due to error, version changes, patches or fixes, etc.). Additionally or alternatively, mismatch between declared and actual dependencies can indicate an attack or other malicious action that is causing the service to malfunction. Additionally or alternatively, mismatch between declared and actual dependencies can indicate an error or omission in the declared dependencies, such as a missing declaration. In these and other implementations, the process 300 can include generating and/or triggering a notification of the results of the evaluation.

Generating Environments Based on Dependencies

Figure 4:
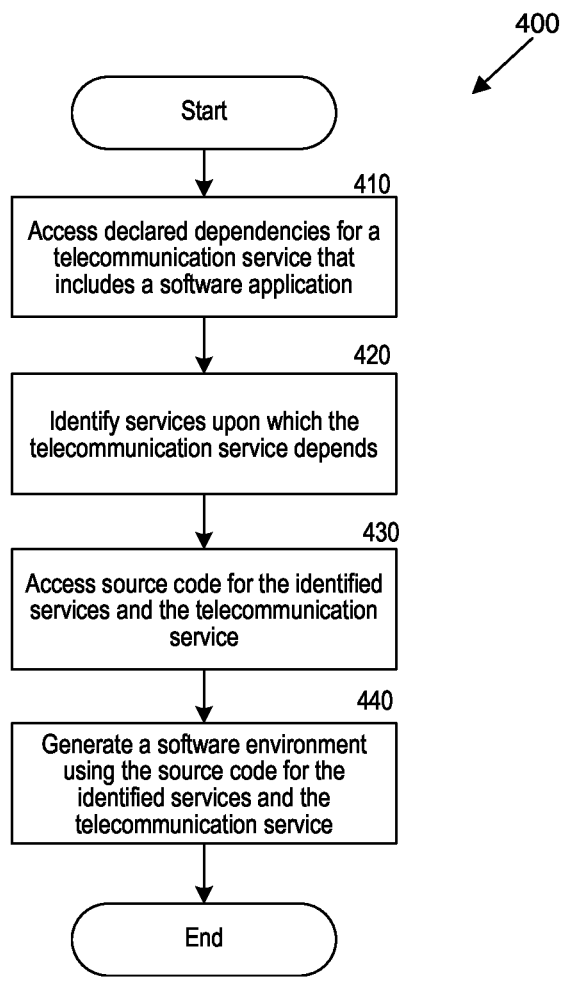
FIG. 4 is a flow diagram that illustrates a process to generate a software environment in some implementations.

FIG. 4 is a flow diagram that illustrates a process 400 to generate a software environment in some implementations. For example, an ephemeral environment can be generated to deploy/evaluate/test a software application and the services upon which the software application depends. At least a portion of the process 400 can be performed by a dependency management system, such as the system 200 of FIG. 2.

The process 400 begins at block 410, where a set of declared dependencies are accessed and/or received for a telecommunication service comprising a software application. Each dependency comprises a service upon which the telecommunication service depends, and can include various information about the service, such as a location, name, version, identifier, and/or environment, etc. for the service.

The process 400 proceeds to block 420, where dependent services specified by the dependencies in the set of dependencies are identified.

The process 400 proceeds to block 430, where source code is accessed for the telecommunication service (e.g., source code for the software application), as well as source code for at least some of the services identified at block 420. Alternatively, information about the telecommunication service and the dependent services can be provided to a CICD platform, which accesses the source code to provision the service runtime.

The process 400 proceeds to block 440, where an environment (e.g., an ephemeral environment) is generated in which the telecommunication service and the dependent services are deployed using the source code accessed at block 430. The environment can be generated as described herein above.

All or portions of the processes 300 and/or 400 can be performed in any order, including performing two or more operations in parallel. Additionally, operations can be added to or removed from the processes 300 and/or 400 without deviating from the teachings of the present disclosure.

Computing System

Figure 5:
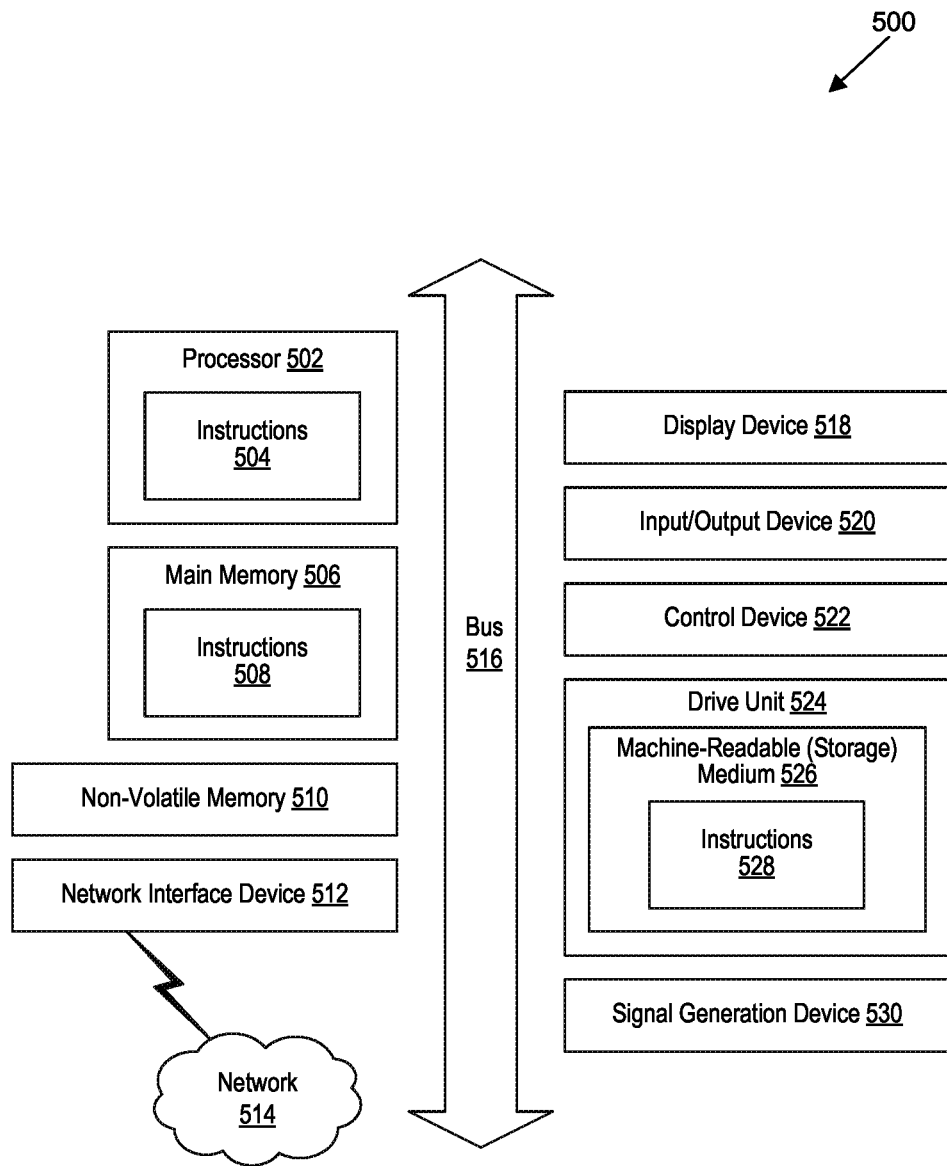
FIG. 5 is a block diagram that illustrates an example of a computer system in which at least some operations described herein can be implemented.

FIG. 5 is a block diagram that illustrates an example of a computing system 500 in which at least some operations described herein can be implemented. As shown, the computing system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computing system 500 is intended to illustrate a hardware device on which components illustrated or described relative to the examples of the figures and any other components described in this specification can be implemented.

The computing system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computing system 500 can be an embedded computer system, a system-on-chip (SOC), a single-board computer system (SBC) or a distributed system such as a mesh of computer systems or include one or more cloud components in one or more networks. Where appropriate, one or more computing systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system to evaluate a telecommunication service based on a set of declared dependencies, the system comprising:
    at least one hardware processor; and
    at least one non-transitory memory carrying instructions that, when executed by the at least one hardware processor, cause the system to perform operations comprising:

accessing a set of declared dependencies for a telecommunication service that includes a software application,
    wherein each declared dependency in the set of declared dependencies is associated with a dependent service used by the telecommunication service,
    wherein one or more dependent services associated with the declared dependencies include a different software application, a web service, or a microservice, and
    wherein the set of declared dependencies is maintained in a data structure such that each entry in the data structure comprises:
        an identifier for the telecommunications service,
        an identifier for the dependent service, and
        a location where health information for the telecommunication service can be accessed;
detecting performance metrics of at least some operations specified in source code for the software application,
    wherein the at least some operations include accessing at least one dependent service of the one or more dependent services associated with the declared dependencies;
generating a set of actual dependencies for the telecommunication service using values that are based, at least in part, on network traffic data,
    wherein at least one dependency in the set of actual dependencies lacks a matching dependency in the set of declared dependencies, or at least one dependency in the set of declared dependencies lacks a matching dependency in the set of actual dependencies;
evaluating at least one feature of the telecommunication service based on comparing the set of actual dependencies to the set of declared dependencies,
    wherein the at least one feature indicates an expected failure of the telecommunication service at runtime;
responsive to the evaluation of the at least one feature indicating the expected failure of the telecommunication service at runtime:
    automatically initiating a preemptive deployment failure of the telecommunication service before the telecommunication service is deployed at runtime; and
    generating a notification that indicates the evaluation of the at least one feature of the telecommunication service.

2. The system of claim 1, wherein at least some dependencies in the set of declared dependencies do not specify an environment in which a corresponding service is deployed.

3. The system of claim 1, wherein evaluating the values of the one or more detected performance metrics to identify the set of actual dependencies for the telecommunication service is performed during runtime.

4. The system of claim 1, wherein evaluating the values of the one or more detected performance metrics to identify the set of actual dependencies for the telecommunication service is based, at least in part, on network traffic associated with the performance of the at least some operations.

5. The system of claim 1, wherein evaluating the at least one feature of the telecommunication service includes determining a performance metric for the telecommunication service, a performance metric for the at least one feature, or both.

6. The system of claim 1, wherein the operations further comprise:
    determining absence or failure of a dependent service associated with a dependency of the set of declared dependencies; and
    causing termination of the at least some operations specified in the source code for the software application.

7. The system of claim 1, wherein a dependency of the set of declared dependencies is associated with a database used by the telecommunication service.

8. At least one computer-readable medium, excluding transitory signals, and carrying instructions that, when executed by at least computing system, cause the computing system to perform operations to generate a software environment for deployment of a telecommunication service, the operations comprising:
    accessing a set of declared dependencies for a telecommunication service that includes a software application,
        wherein each declared dependency in the set of declared dependencies is associated with a dependent service used by the telecommunication service, and
        wherein one or more dependent services associated with the declared dependencies include a different software application, a web service, or a microservice;
    identifying, based on the set of declared dependencies, a set of dependent services used by the telecommunication service;
    causing generation of a software environment for deployment of the software application and the set of dependent services;
    detecting execution of operations by the software application in the generated software environment;
    receiving an analysis of results of the execution of the operations to generate a set of actual dependencies for the telecommunication service using values that are based, at least in part, on network traffic data,
        wherein at least one dependency in the set of actual dependencies lacks a matching dependency in the set of declared dependencies, or at least one dependency in the set of declared dependencies lacks a matching dependency in the set of actual dependencies; and
    evaluating at least one feature of the telecommunication service based on comparing the set of actual dependencies to the set of declared dependencies,
        wherein the at least one feature indicates an expected failure of the telecommunication service at runtime; and
    responsive to the evaluation of the at least one feature indicating the expected failure of the telecommunication service at runtime:
        automatically initiating a preemptive deployment failure of the telecommunication service before the telecommunication service is deployed at runtime.

9. The at least one computer-readable medium of claim 8, wherein the operations further comprise:
    detecting execution of operations specified by the software application in the generated software environment;
    receiving an analysis of results of the execution of the operations to identify a set of actual dependencies for the telecommunication service,
        wherein the analysis of the results of the execution of the operations is based, at least in part, on network traffic associated with the execution of the operations; and evaluating at least one feature of the telecommunication service based on comparing the set of actual dependencies to the set of declared dependencies.

10. The at least one computer-readable medium of claim 8, wherein at least some dependencies in the set of declared dependencies do not specify an environment in which a corresponding service is deployed.

11. The at least one computer-readable medium of claim 8, wherein the operations further comprise:
determining absence or failure of a dependent service associated with a dependency of the set of declared dependencies; and
causing termination of the at least some operations specified in source code for the software application.

12. The at least one computer-readable medium of claim 8, wherein the set of declared dependencies are represented using YAML (YAML Ain't Markup Language).

13. The at least one computer-readable medium of claim 8, wherein evaluating the at least one feature of the telecommunication service includes determining a performance metric for the telecommunication service, a performance metric for the at least one feature, or both.

14. At least one computer-readable medium, excluding transitory signals, and carrying instructions that, when executed by at least computing system, cause the computing system to perform operations to evaluate a telecommunication service based on a set of declared dependencies, the operations comprising:
accessing a set of declared dependencies for a telecommunication service that includes a software application,
wherein each declared dependency in the set of declared dependencies is associated with a dependent service used by the telecommunication service, and
wherein one or more dependent services associated with the declared dependencies include a different software application, a web service, or a microservice;
detecting a set of performance metrics of at least some operations specified in source code for the software application,
wherein the at least some operations include accessing at least one dependent service of the one or more dependent services associated with the declared dependencies, and
wherein at least one performance metric value in the detected set of performance metrics has a corresponding narrative describing a service incident associated with the at least one dependent service;
generating a set of actual dependencies for the telecommunication service using values that are based, at least in part, on network traffic data,
wherein at least one dependency in the set of actual dependencies lacks a matching dependency in the set of declared dependencies, or at least one dependency in the set of declared dependencies lacks a matching dependency in the set of actual dependencies; and
evaluating at least one feature of the telecommunication service based on comparing the set of actual dependencies to the set of declared dependencies,
wherein the at least one feature indicates an expected failure of the telecommunication service at runtime; and
responsive to the evaluation of the at least one feature indicating the expected failure of the telecommunication service at runtime:
automatically initiating a preemptive deployment failure of the telecommunication service before the telecommunication service is deployed at runtime.

15. The at least one computer-readable medium of claim 14, wherein at least some dependencies in the set of declared dependencies do not specify an environment in which a corresponding service is deployed.

16. The at least one computer-readable medium of claim 14, wherein evaluating the values of the one or more detected performance metrics to identify the set of actual dependencies is performed during runtime.

17. The at least one computer-readable medium of claim 14, wherein evaluating the values of the one or more detected performance metrics to identify the set of actual dependencies is based, at least in part, on network traffic associated with the performance of the at least some operations.

18. The at least one computer-readable medium of claim 14, wherein evaluating the at least one feature of the telecommunication service includes determining a performance metric for the telecommunication service, a performance metric for the at least one feature, or both.

19. The at least one computer-readable medium of claim 14, wherein the operations further comprise:
determining absence or failure of a dependent service associated with a dependency of the set of declared dependencies; and
causing termination of the at least some operations specified in the source code for the software application.

20. The at least one computer-readable medium of claim 14, wherein a dependency of the set of declared dependencies is associated with a database used by the telecommunication service.

* * * * *